United States Patent
Sworen et al.

(10) Patent No.: US 9,260,605 B2
(45) Date of Patent: *Feb. 16, 2016

(54) URETHANE BASED EXTENDERS FOR SURFACE EFFECT COMPOSITIONS

(71) Applicant: THE CHEMOURS COMPANY FC LLC, Wilmington, DE (US)

(72) Inventors: John Christopher Sworen, Chadds Ford, PA (US); Gerald Oronde Brown, Wilmington, DE (US); Mario Vincenzini, Coatesville, PA (US); Flemming Vang Sparsoe, Skanderborg (DK)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/226,907

(22) Filed: Mar. 27, 2014

(65) Prior Publication Data

US 2014/0296123 A1 Oct. 2, 2014

Related U.S. Application Data

(60) Provisional application No. 61/806,458, filed on Mar. 29, 2013.

(51) Int. Cl.

| | |
|---|---|
| *C08L 75/06* | (2006.01) |
| *C08L 75/08* | (2006.01) |
| *C08G 18/00* | (2006.01) |
| *C08G 18/36* | (2006.01) |
| *C08G 18/80* | (2006.01) |
| *C08L 33/10* | (2006.01) |
| *C11D 3/00* | (2006.01) |
| *C08G 18/62* | (2006.01) |
| *C08G 18/78* | (2006.01) |
| *D06M 15/227* | (2006.01) |
| *D06M 15/263* | (2006.01) |
| *D06M 15/267* | (2006.01) |
| *D06M 15/277* | (2006.01) |
| *D06M 15/295* | (2006.01) |
| *D06M 15/53* | (2006.01) |
| *D06M 15/564* | (2006.01) |
| *D06M 15/568* | (2006.01) |
| *D06M 15/572* | (2006.01) |
| *D06M 15/576* | (2006.01) |
| *D06M 15/643* | (2006.01) |
| *D21H 19/24* | (2006.01) |
| *C08G 18/79* | (2006.01) |
| *C11D 3/37* | (2006.01) |

(52) U.S. Cl.
CPC ............... *C08L 75/08* (2013.01); *C08G 18/36* (2013.01); *C08G 18/6279* (2013.01); *C08G 18/7831* (2013.01); *C08G 18/792* (2013.01); *C08G 18/80* (2013.01); *C08L 33/10* (2013.01); *C08L 75/06* (2013.01); *C11D 3/001* (2013.01); *C11D 3/0005* (2013.01); *C11D 3/0036* (2013.01); *C11D 3/3726* (2013.01); *D06M 15/227* (2013.01); *D06M 15/263* (2013.01); *D06M 15/267* (2013.01); *D06M 15/277* (2013.01); *D06M 15/295* (2013.01); *D06M 15/53* (2013.01); *D06M 15/564* (2013.01); *D06M 15/568* (2013.01); *D06M 15/572* (2013.01); *D06M 15/576* (2013.01); *D06M 15/643* (2013.01); *D21H 19/24* (2013.01); *D06M 2200/01* (2013.01); *D06M 2200/10* (2013.01); *D06M 2200/11* (2013.01); *D06M 2200/12* (2013.01); *D06M 2200/20* (2013.01); *D06M 2200/35* (2013.01); *D06M 2200/45* (2013.01); *D06M 2200/50* (2013.01)

(58) Field of Classification Search
CPC ....... C11D 3/3726; C08L 75/06; C08L 75/08; C08G 17/92; C08G 18/00; C08G 18/36; C08G 18/80

See application file for complete search history.

(56) References Cited

U.S. PATENT DOCUMENTS

| | | | |
|---|---|---|---|
| 3,505,001 A * | 4/1970 | Wagner | 8/192 |
| 4,304,683 A | 12/1981 | Morinaka et al. | |
| 4,360,447 A | 11/1982 | Morinaka et al. | |
| 6,864,312 B2 | 3/2005 | Moore | |
| 7,344,758 B2 | 3/2008 | Franchina et al. | |
| 8,349,986 B2 | 1/2013 | Rukavina et al. | |
| 8,586,697 B2 | 11/2013 | Elizalde et al. | |
| 2003/0120101 A1 | 6/2003 | Lai | |
| 2005/0085573 A1 | 4/2005 | Sandner | |
| 2006/0052556 A1 | 3/2006 | Franchina et al. | |
| 2006/0151739 A1 | 7/2006 | Sandner | |

(Continued)

FOREIGN PATENT DOCUMENTS

| | | |
|---|---|---|
| CN | 101914185 A | 12/2010 |
| EP | 2415879 | 2/2012 |

(Continued)

OTHER PUBLICATIONS

International Search Report, PCT/US2010/032097, Mailed November 14, 2014.

(Continued)

*Primary Examiner* — Brian P Mruk

(57) ABSTRACT

A method of treating a substrate comprising contacting the substrate with a composition comprising i) an agent which provides a surface effect and ii) a polymer extender composition comprising a urethane based compound, a composition for treating a substrate, and treated substrates thereof.

21 Claims, No Drawings

(56) References Cited

U.S. PATENT DOCUMENTS

| | | |
|---|---|---|
| 2007/0009663 A1 | 1/2007 | Wang et al. |
| 2007/0167601 A1 | 7/2007 | Rukavina et al. |
| 2008/0146750 A1 | 6/2008 | Corn |
| 2010/0124649 A1 | 5/2010 | Rukavina et al. |
| 2010/0190397 A1 | 7/2010 | Duschek |
| 2014/0031483 A1 | 1/2014 | Elizalde et al. |

FOREIGN PATENT DOCUMENTS

| | | |
|---|---|---|
| JP | 1972003477 B | 1/1972 |
| JP | 1973004940 | 1/1973 |
| JP | 1983079008 | 5/1983 |
| JP | 1985045678 B2 | 10/1985 |
| JP | 05331130 A | 12/1993 |
| KR | 2009002894 A1 | 1/2009 |
| WO | 200037525 A1 | 6/2000 |
| WO | 03089477 A1 | 10/2003 |
| WO | 2006024669 A1 | 3/2006 |
| WO | 200640333 A1 | 4/2006 |
| WO | 2009015136 A1 | 1/2009 |
| WO | 2011124710 A | 10/2011 |

OTHER PUBLICATIONS

Mao et al., Effect of additives on microstructure and properties of polyurethane coating film for fabrics, Fangzhi Xuebao (1996), 17(2), 4-7 (Abstract Attached).

* cited by examiner

URETHANE BASED EXTENDERS FOR SURFACE EFFECT COMPOSITIONS

The instant application claims benefit to Provisional Application Ser. No. 61/806,458, filed on Mar. 29, 2013.

FIELD OF THE INVENTION

Hydrocarbon polymers are employed as extenders to improve the performance of treating agents which provide surface effects to treated substrates.

BACKGROUND OF THE INVENTION

Various compositions are known to be useful as treating agents to provide surface effects to substrates. Surface effects include repellency to moisture, soil and stain resistance, and other effects which are particularly useful for fibrous substrates such as fibers, fabrics, textiles, carpets, paper, leather and other such substrates. Many such treating agents are partially fluorinated polymers or copolymers.

Fluorinated polymer compositions having utility as fibrous substrate treating agents generally contain pendant perfluoroalkyl groups of three or more carbon atoms, which provide oil- and water-repellency when the compositions are applied to fibrous substrate surfaces. The perfluoroalkyl groups are generally attached by various connecting groups to polymerizable groups not containing fluorine. The resulting monomer is then generally copolymerized with other monomers which confer additional favorable properties to the substrates. Various specialized monomers may be incorporated to impart improved cross-linking, latex stability and substantivity. Since each ingredient may impart some potentially undesirable properties in addition to its desirable ones, the specific combination is directed to the desired use. These polymers are generally marketed as aqueous emulsions for easy application to the fibrous substrates.

Various attempts have been made to increase the oil- and water-repellency imparted to the substrate and its durability while reducing the amount of fluorinated polymer required, i.e., boost the efficiency or performance of the treating agent. One method is to incorporate blocked isocyanates or melamine resins. However, only limited amounts can be used because these ingredients tend to adversely affect the handle (the feel) of the fibrous substrate. Another approach employs use of various extender polymers. These are typically hydrocarbon polymers in aqueous emulsions, which are blended with the fluorinated polymer emulsion before application to the substrate.

U.S. Pat. No. 7,344,758 discloses an emulsion suitable for imparting oil and/or water-repellency to substrates, containing a fluorinated acrylate copolymer.

BRIEF SUMMARY OF THE INVENTION

There is a need for polymer compositions which significantly improve the performance of surface effect agents. In particular, there is a need for compositions which improve the durability of surface effects for substrates while reducing the amount of fluorinated polymer required. The present invention provides such a composition.

The present invention comprises a method of treating a substrate comprising contacting the substrate with a composition comprising i) an agent which provides a surface effect and ii) a polymer extender composition comprising a compound prepared by: (i) reacting (a) at least one isocyanate group-containing compound selected from isocyanate, diisocyanate, polyisocyanate, or mixture thereof, and (b) at least one isocyanate-reactive compound selected from formula (Ia), (Ib), or (Ic):

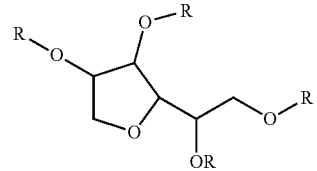
(Ia)

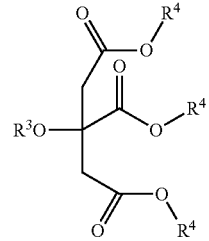
(Ib)

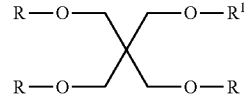
(Ic)

wherein each R is independently a —H; —$R^1$; —C(O)$R^1$; —(CH$_2$CH$_2$O)$_n$(CH(CH$_3$)CH$_2$O)$_m$$R^2$; or —(CH$_2$CH$_2$O)$_n$(CH(CH$_3$)CH$_2$O)$_m$C(O)$R^1$;

each n is independently 0 to 20;
each m is independently 0 to 20;
m+n is greater than 0;
each $R^1$ is independently a linear or branched alkyl group having 5 to 29 carbons optionally comprising at least 1 unsaturated bond;
each $R^2$ is independently —H, or a linear or branched alkyl group having 6 to 30 carbons optionally comprising at least 1 unsaturated bond;
or a mixtures thereof,
provided that when the compound is of Formula (Ia) then at least one of R or $R^2$ is —H;

each $R^3$ is independently a —H; —$R^1$; —C(O)$R^1$; —(CH$_2$CH$_2$O)$_n$(CH(CH$_3$)CH$_2$O)$_m$$R^2$; or —(CH$_2$CH$_2$O)$_n$(CH((CH$_3$)CH$_2$)$_m$C(O)$R^1$;
each $R^4$ is independently —H, a linear or branched alkyl group having 6 to 30 carbons optionally comprising at least 1 unsaturated bond, or combinations thereof; —(CH$_2$CH$_2$O)$_n$(CH(CH$_3$)CH$_2$O)$_m$$R^2$; or —(CH$_2$CH$_2$O)$_n$(CH(CH$_3$)CH$_2$O)$_m$C(O)$R^1$;
each n' is independently 0 to 20;
each m' is independently 0 to 20;
m'+n' is greater than 0;
provided when the compound is Formula (Ib), then at least one $R^2$, $R^3$ or $R^4$ is a —H; and
each $R^{19}$ is —H, —C(O)$R^1$, or —CH$_2$C[CH$_2$OR]$_3$,
provided when the compound is Formula (Ic), then at least one $R^{19}$ or R is —H.

The present invention further comprises a substrate treated with a composition comprising a treating agent which when applied to a substrate provides a surface effect and the above-described extender composition.

The present invention further comprises a composition for treating a substrate comprising i) an agent which provides a surface effect and ii) a polymer extender composition comprising a compound prepared by: (i) reacting (a) at least one isocyanate group-containing compound selected from isocyanate, diisocyanate, polyisocyanate, or mixture thereof, and (b) at least one isocyanate-reactive compound selected from formula (Ia), (Ib), or (Ic).

DETAILED DESCRIPTION OF THE INVENTION

Trademarks are indicated herein by capitalization.

The present invention comprises a method of treating a substrate comprising contacting said substrate with a composition comprising a treating agent, which when applied to a substrate provides a surface effect, and an extender composition. In particular, the extender composition is a non-fluorinated urethane useful for improving the performance of fluorinated polymers in imparting durable repellent properties to fibrous substrates. The fibrous substrates include fibers, textiles, paper, nonwovens, leather, carpets, fabrics, fabric blends or a combination thereof. By "fabrics" is meant natural or synthetic fabrics, or blends thereof, composed of fibers such as cotton, rayon, silk, wool, polyester, polypropylene, polyolefins, nylon, and aramids such as "NOMEX" and "KEVLAR." By "fabric blends" is meant fabric made of two or more types of fibers. Typically these blends are a combination of at least one natural fiber and at least one synthetic fiber, but also can be a blend of two or more natural fibers or of two or more synthetic fibers.

Superior durable surface properties, along with desirable properties of low yellowing and good durability, are imparted to fibrous substrates by the addition of the inventive extender composition to surface treating agents before application to fibrous substrates. These combined blends are applied to the fibrous substrates in the form of a dispersion in water or other solvent either before, after or during the application of other treatment chemicals.

When so applied, the extender composition useful in this invention, in combination with a treating agent, has been found in particular to improve the durability of surface properties, especially oil- and water-repellency, in fibrous substrates after laundering by as much as 50%. The durability of the repellency is improved compared to other known extender compositions. Further, use of the extender composition of the present invention increases fluorine efficiency of fluorinated treating agents by permitting use of lower levels of the fluorinated polymer.

The aqueous dispersion blends produced by mixing the extender composition dispersion with a treating agent dispersion are applied to surfaces of fibrous substrates by known methods to impart oil-, soil- and water-repellency and other surface effects. A distinguishing feature of use of the treating agent-extender compositions of the present invention is high durability of the surface finish on the substrate.

The extender composition useful in the present invention comprises a compound prepared by:

(i) reacting (a) at least one isocyanate group-containing compound selected from isocyanate, diisocyanate, polyisocyanate, or mixture thereof, and (b) at least one isocyanate-reactive compound selected from formula (Ia), (Ib), or (Ic):

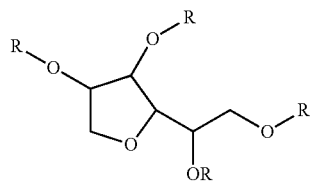

(Ia)

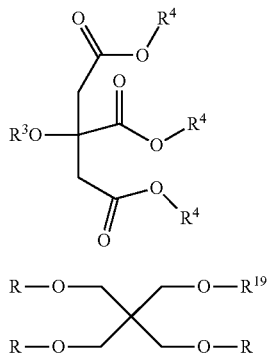

(Ib)

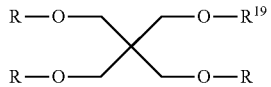

(Ic)

wherein each R is independently a —H; —R$^1$; —C(O)R$^1$; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$;

each n is independently 0 to 20;

each m is independently 0 to 20;

m+n is greater than 0;

each R$^1$ is independently a linear or branched alkyl group having 5 to 29 carbons optionally comprising at least 1 unsaturated bond;

each R$^2$ is independently —H, or a linear or branched alkyl group having 6 to 30 carbons optionally comprising at least 1 unsaturated bond;

or a mixtures thereof, provided that when the compound is of Formula (Ia) then at least one of R or R$^2$ is —H;

each R$^3$ is independently a —H; —R$^1$; —C(O)R$^1$; —(CH$_2$CH$_2$O)$_{n'}$(CH(CH$_3$)CH$_2$O)$_{m'}$R$^2$; or —(CH$_2$CH$_2$O)$_{n'}$(CH(CH$_3$)CH$_2$O)$_{m'}$C(O)R$^1$;

each R$^4$ is independently —H, a linear or branched alkyl group having 6 to 30 carbons optionally comprising at least 1 unsaturated bond, or combinations thereof; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$;

each n' is independently 0 to 20;

each m' is independently 0 to 20;

m'+n' is greater than 0;

provided when the compound is Formula (Ib), then at least one R$^2$, R$^3$ or R$^4$ is a —H; and each R$^{19}$ is —H, —C(O)R$^1$, or —CH$_2$C[CH$_2$OR]$_3$, provided when the compound is Formula (Ic), then at least one R$^{19}$ or R is —H.

For compounds of Formula (Ia), (Ib), or (Ic), the —(CH$_2$CH$_2$O)— represents oxyethylene groups (EO) and —(CH(CH$_3$)CH$_2$O)— represents oxypropylene groups (PO). These compounds can contain only EO groups, only PO groups, or mixtures thereof. These compounds can also be present as a tri-block copolymer designated PEG-PPG-PEG (polyethylene glycol-polypropylene glycol-polyethylene glycol), for example.

In one embodiment, a polymer extender compound is prepared by: (i) reacting (a) at least one isocyanate group-containing isocyanate, diisocyanate, polyisocyanate, or mixture thereof, and compounds of Formula (Ia). Compounds of Formula (Ia) where at least one of R is —H and at least one R is selected from —C(O)R$^1$ are commonly known as alkyl sorbitans. These sorbitans can be mono-substituted, di-substituted, or tri-substituted with —C(O)R$^1$. It is known that commercially available sorbitans, such as SPAN, contain a mixture of the various sorbitans ranging from where each R is H (un-substituted), and sorbitans where each R is —C(O)R$^1$ (fully substituted); wherein $R^1$ is a linear or branched alkyl group having 5 to 29 carbons; and mixtures of various substitutions thereof. The commercially available sorbitans may also include amounts of sorbitol, isosorbide, or other intermediates or byproducts.

In one preferred embodiment, at least one R is —C(O)$R^1$, and $R^1$ is a linear branched alkyl group having 5 to 29 carbons, more preferably 7 to 21 carbons, and most preferably 11 to 21 carbons. Preferred compounds include mono-, di-, and tri-substituted sorbitans derived from caprylic acid, capric acid, lauric acid, mysteric acid, palmitic acid, stearic acid, arachidic acid, behenic acid, lignoceric acid, and mixtures thereof. Particularly preferred compounds include mono-, di-, and tri-substituted sorbitan stearates or sorbitan behenins.

Optionally, $R^1$ is a linear or branched alkyl group having 5 to 29 carbons comprising at least 1 unsaturated bond. Examples of compounds of Formula (Ia) wherein at least one R is selected from —C(O)$R^1$; and $R^1$ contains least 1 unsaturated bond, include, but are not limited to, sorbitan trioleate (i.e., wherein $R^1$ is —$C_7H_{14}CH$=$CHC_8H_{17}$). Other examples but are not limited to include mono-, di-, and tri-substituted sorbitans derived from palmitoleic acid, lineolic acid, arachidonic acid, and erucic acid.

In one embodiment, a compound of Formula (Ia) is employed, wherein at least one R is independently —$(CH_2CH_2O)_n(CH(CH_3)CH_2O)_mR^2$ or —$(CH_2CH_2O)_n(CH(CH_3)CH_2O)_mC(O)R^1$. Compounds of Formula (Ia), wherein at least one R is —$(CH_2CH_2O)_n(CH(CH_3)CH_2O)_mR^2$ or —$(CH_2CH_2O)_n(CH(CH_3)CH_2O)_mC(O)R^1$, wherein each m is independently 0 to 20, each n is independently 0 to 20, and n+m is greater than 0 are known as polysorbates and are commercially available under the tradename TWEEN. These polysorbates can be mono-substituted, di-substituted, or tri-substituted with alkyl groups $R^1$ or $R^2$. It is known that commercially available polysorbates, contain a mixture of the various polysorbates ranging from where each $R^2$ is H (unsubstituted), and polysorbates where each $R^1$ is a linear or branched alkyl group having 5 to 29 carbons (fully substituted); and mixtures of various substitutions thereof. Examples of compounds of Formula (Ia) include polysorbates such as polysorbate tristearate, and polysorbate monostearate. Examples of compounds of Formula (Ia) wherein m+n is greater than 0, and wherein $R^1$ comprises at least 1 unsaturated bond, but not limited to, polysorbate trioleate (wherein $R^1$ is $C_7H_{14}CH$=$CHC_8H_{17}$) and are sold commercially under the name Polysorbate 80. Reagents may include mixtures of compounds having various values for R, $R^1$, and $R^2$, and may also include mixtures of compounds where $R^1$ comprises at least one unsaturated bond with compounds where $R^1$ is fully saturated.

Compounds of Formula (Ib) are known as alkyl citrates. These citrates can be present as a mono-substituted, di-substituted, or tri-substituted with alkyl groups. It is known that commercially available citrates contain a mixture of the various citrates as well as citric acids from where $R^3$ and each $R^4$ is —H, ranging to citrates where each $R^4$ is a linear or branched alkyl group having 6 to 30 carbons optionally comprising at least 1 unsaturated bond; and mixtures of various substitutions thereof. Mixtures of citrates having various values for $R^1$, $R^2$, $R^3$, and $R^4$ may be used, and may also include mixtures of compounds where $R^1$ comprises at least one unsaturated bond with compounds where $R^1$ is fully saturated. Alkyl citrates are also commercially available wherein m'+n' is greater than 0, $R^4$ is —$(CH_2CH_2O)_n(CH(CH_3)CH_2O)_mR^2$; or —$(CH_2CH_2O)_n(CH(CH_3)CH_2O)_mC(O)R^1$ and are present in the various substitutions from wherein $R^3$ and each $R^2$ is H to wherein each $R^1$ and/or $R^2$ is a linear or branched alkyl group having 5 to 30 carbons optionally comprising at least 1 unsaturated bond. Examples of compounds of Formula (Ib) include, but are not limited to, trialkyl citrates.

Compounds of Formula (Ic) are known as pentaerythriol esters. These pentaerythriol esters can be present as a mono-substituted, di-substituted, or tri-substituted with alkyl groups. Preferred compounds of Formula (Ic) are dipentaerythriol esters, where $R^{19}$ is —$CH_2C[CH_2OR]_3$. It is known that commercially available pentaerythriol esters contain a mixture of the various pentaerythriol esters where $R^{19}$ and each R is —H, ranging to pentaerythriol esters where each R is —C(O)$R^1$, and $R^1$ is a linear or branched alkyl group having 5 to 29 carbons optionally comprising at least 1 unsaturated bond; and mixtures of various substitutions thereof. The pentaerythriol esters also may contain compounds with mixtures of different chain lengths for R. The pentaerythriol esters also may contain compounds with mixtures of different chain lengths for R, or mixtures of compounds where $R^1$ comprises at least one unsaturated bond with compounds where $R^1$ is fully saturated.

Compounds of Formulas (Ia), (Ib), and (Ic) can all be bio-based derived. By "bio-based derived", it is meant that at least 10% of the material can be produced from non-crude oil sources, such as plants, other vegetation, and tallow. In one embodiment, the compounds of formulas (Ia), (Ib), and (Ic) are from about 10% to 100% bio-based. In one embodiment, the compounds of formulas (Ia), (Ib), and (Ic) are from about 35% to 100% bio-based. In one embodiment, the compounds of formulas (Ia), (Ib), and (Ic) are from about 50% to 100% bio-based. In one embodiment, the compounds of formulas (Ia), (Ib), and (Ic) are from about 75% to 100% bio-based. In one embodiment, the compounds of formulas (Ia), (Ib), and (Ic) are 100% bio-based. At least one R, $R^3$, $R^4$, $R^{19}$ of each of Formulas (Ia), (Ib), and (Ic) is —H to allow reactivity with isocyanate groups. The average OH value of the compounds can range from just greater than 0 to about 230, preferably about 10 to about 175, and most preferably from about 25 to about 140.

To make the polymer extender compounds of the present invention, a compound of formula (Ia), (Ib), or (Ic), or mixtures thereof, is reacted with an isocyanate group-containing isocyanate, diisocyanate, polyisocyanate, or mixture thereof. The isocyanate group-containing compound adds to the branched nature of the polymer. The term "polyisocyanate" is defined as di- and higher-functional isocyanates, and the term includes oligomers. Any monoisocyanate or polyisocyanate having predominately two or more isocyanate groups, or any isocyanate precursor of a polyisocyanate having predominately two or more isocyanate groups, is suitable for use in this invention. For example, hexamethylene diisocyanate homopolymers are suitable for use herein and are commercially available. It is recognized that minor amounts of diisocyanates can remain in products having multiple isocyanate groups. An example of this is a biuret containing residual small amounts of hexamethylene diisocyanate.

Also suitable for use as the polyisocyanate reactant are hydrocarbon diisocyanate-derived isocyanurate trimers. Preferred is DESMODUR N-100 (a hexamethylene diisocyanate-based available from Bayer Corporation, Pittsburgh, Pa.). Other triisocyanates useful for the purposes of this invention are those obtained by reacting three moles of toluene diisocyanate. The isocyanurate trimer of toluene diisocyanate and that of 3-isocyanatomethyl-3,4,4-trimethylcyclohexyl isocyanate are other examples of triisocyanates useful for the purposes of this invention, as is methane-tris-(phenylisocyanate). Precursors of polyisocyanate, such as diisocyanate, are also suitable for use in the present invention as substrates for the polyisocyanates. DESMODUR N-3300, DESMODUR N-3600, DESMODUR Z-4470, DESMODUR H, DESMODUR N3790, and DESMODUR XP 2410, from Bayer Corporation, Pittsburgh, Pa., and bis-(4-isocyanatocylohexyl) methane are also suitable in the invention.

Preferred polyisocyanate reactants are the aliphatic and aromatic polyisocyanates containing biuret structures, or polydimethyl siloxane containing isocyanates. Such polyisocyanates can also contain both aliphatic and aromatic substituents.

Particularly preferred as the (poly)isocyanate reactant for all the embodiments of the invention herein are hexamethylene diisocyanate homopolymers commercially available, for instance as DESMODUR N-100, DESMODUR N-75 and DESMODUR N-3200 from Bayer Corporation, Pittsburgh, Pa.; 3-isocyanatomethyl-3,4,4-trimethylcyclohexyl isocyanate available, for instance as DESMODUR I (Bayer Corporation); bis-(4-isocyanatocylohexyl)methane available, for instance as DESMODUR W (Bayer Corporation) and diisocyanate trimers of formulas (IIa), (IIb), (IIc) and (IId):

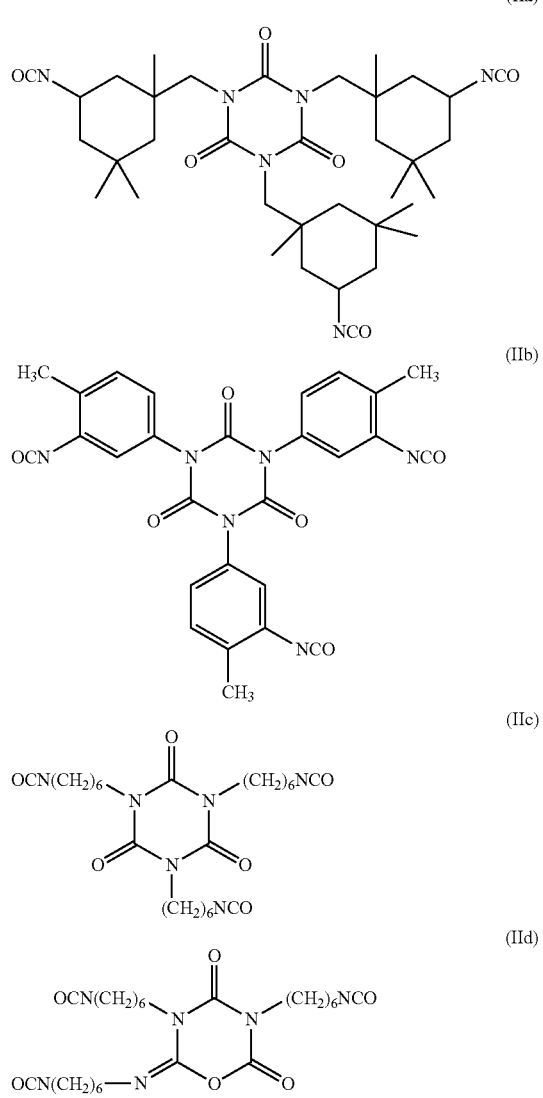

The diisocyanate trimers (IIa-d) are available, for instance as DESMODUR Z4470, DESMODUR IL, DESMODUR N-3300, and DESMODUR XP2410, respectively, from Bayer Corporation.

In one embodiment, the reaction product of (a) an isocyanate-containing compound with (b) an isocyanate-reactive compound contains unreacted isocyanate groups which are further reacted with (c) at least one second compound selected from water, organic compounds of Formula (IIIa)

$$R^5—X \quad (IIIa),$$

organic compounds of Formula (IIIb)

$$R^{15}—(OCH_2CH(OR^{16})CH_2)_z—OR^{17} \quad (IIIb),$$

or mixtures thereof, wherein $R^5$ is selected from a $—C_1$ to $C_{30}$ linear or branched alkyl optionally comprising at least one unsaturated group, a hydroxy-functional $C_1$ to $C_{30}$ linear or branched alkyl, a hydroxy-functional linear or branched $C_1$ to $C_{30}$ polyether, a hydroxy-functional linear or branched polyester, a hydroxy-functional linear or branched organosiloxane, a thiol-functional $C_1$ to $C_{30}$ linear or branched alkyl, an amine-functional $C_1$ to $C_{30}$ linear or branched alkyl,

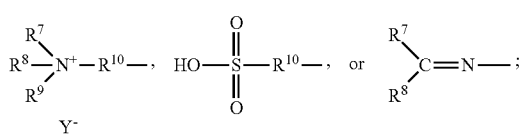

wherein $R^7$, $R^8$, and $R^9$ are each independently, $—H$, $—C_1$ to $C_6$ alkyl, or combinations thereof; $R^{10}$ is a divalent alkyl group of 1 to 20 carbons; X is an isocyanate-reactive functional group such as $—OH$, $—C(O)OH$, $—SH$, $—NH(R^{12})$, $—O—(CH_2CH_2O)_s(CH(CH_3)CH_2O)_t—H$ or $—[C(O)]—O—(CH_2CH_2O)_s(CH(CH_3)CH_2O)_t—H$; $R^{12}$ is $—H$ or a monovalent $C_1$ to $C_6$ alkyl group; $R^{15}$, $R^{16}$, and $R^{17}$ are each independently a $—H$; $—R^{18}$; $—C(O)R^{18}$ provided that at least one $R^{15}$, $R^{16}$, or $R^{17}$ is a $—H$; $R^{18}$ is independently a linear or branched alkyl group having 5 to 29 carbons optionally comprising at least 1 unsaturated bond; z is 1 to 15; Y is $—Cl$; s is an integer of 0 to 50; t is an integer of 0 to 50; s+t is greater than 0. The term "branched", as used herein, means that the functional chain can be branched at any point, for example as a quarternary substituted carbon, and can contain any number of branched substitutions.

In one embodiment, the second compound is present and reacts with about 0.1 mol % to about 60 mol % of said isocyanate groups. Preferably the concentration of compounds of isocyanate-reactive compound (b) is greater than the concentration of second compound(s) (c).

In one embodiment, the second compound (c) of the polymer extender compound is water. Water may be used to crosslink unreacted isocyanate groups by urea linkage. In a further embodiment, the second compound (c) is of Formula (IIIa). The compound of formula (IIIa) can be a hydrophilic water-solvatable material comprising at least one hydroxy-terminated polyether of formula (IIIa) wherein isocyanate-reactive group X is $—O—(CH_2CH_2O)(CH(CH_3)CH_2O)_t—H$ or $—[C(O)]—O—(CH_2CH_2O)_s(CH(CH_3)CH_2O)_t—H$. In this embodiment, $—(CH_2CH_2O)—$ represents oxyethylene groups (EO) and $—(CH(CH_3)CH_2O)—$ represents oxypropylene groups (PO). These polyethers can contain only EO groups, only PO groups, or mixtures thereof. These polyethers can also be present as a tri-block copolymer designated PEG-PPG-PEG (polyethylene glycol-polypropylene glycol-polyethylene glycol). Preferably, the polyethers are the commercially available methoxypolyethylene glycols (MPEG's), or mixtures thereof. Also commercially available, and suitable for the preparation of the compositions of the present invention, are butoxypolyoxyalkylenes containing equal amounts by weight of oxyethylene and oxypropylene groups (Union Carbide Corp. 50-HB Series UCON Fluids and Lubricants) and having an average molecular weight greater than about 1000. The hydroxy-terminal polyethers of Formula (IIIa) preferably have an average molecular weight equal to or greater than about 200, and most preferably between 350 and 2000.

In another embodiment, the second compound (c) is an organic compound of Formula (IIIa), where isocyanate-reactive group X is —OH, —C(O)OH, —SH, —NH($R^{12}$); and $R^5$ is selected from a —$C_1$ to $C_{30}$ linear or branched alkyl optionally comprising at least one unsaturated group, a hydroxy-functional $C_1$ to $C_{30}$ linear or branched alkyl, a hydroxy-functional linear or branched $C_1$ to $C_{30}$ polyether, a hydroxy-functional linear or branched polyester, a hydroxy- or amine-functional linear or branched organosiloxane, a thiol-functional $C_1$ to $C_{30}$ linear or branched alkyl, an amine-functional $C_1$ to $C_{30}$ linear or branched alkyl.

Where isocyanate-reactive group X is —OH, examples of Formula (IIIa) include but are not limited to alkyl alcohols such as propanol, butanol, or fatty alcohols including stearyl alcohol ($R^5$ is a —$C_1$ to $C_{30}$ linear or branched alkyl optionally comprising at least one unsaturated group); alkyl diols or polyols such as ethanediol, propanediol, butanediol, or hexanediol ($R^5$ is a hydroxy-functional $C_1$ to $C_{30}$ linear or branched alkyl); alkylene glycol ethers such as triethylene glycol, tetraethylene glycol, poly(ethylene glycol) (PEG), poly(propylene glycol) (PPG), poly(tetrahydrofuran), or glycol ethers having mixtures of PEG, PPG, or THF units ($R^5$ is a hydroxy-functional linear or branched $C_1$ to $C_{30}$ polyether); polyester polyols ($R^5$ is a hydroxy-functional linear or branched polyester); silicone prepolymer polyols ($R^5$ is a hydroxy-functional linear or branched organosiloxane); N,N-dimethylaminoethanol ($R^5$ is an amine-functional $C_1$ to $C_{30}$ linear or branched alkyl); choline chloride or betaine HCl ($R^5$ is $Y^-$ ($R^7$)($R^8$)($R^9$)$N^+R^{10}$—); butanone oxime ($R^5$ is ($R^7$)($R^8$)C=N—). The polyether polyols can contain only EO groups, only PO groups, only THF groups, or mixtures thereof. These polyethers can also be present as a block copolymer, such as that designated by PEG-PPG-PEG (polyethylene glycol-polypropylene glycol-polyethylene glycol). Preferably, the polyether glycols have an average molecular weight equal to or greater than about 200, and most preferably between 350 and 2000.

Where isocyanate-reactive group X is —C(O)OH, examples of Formula (IIIa) include but are not limited to fatty acids such as caprylic acid, capric acid, lauric acid, mysteric acid, palmitic acid, stearic acid, arachidic acid, behenic acid, lignoceric acid, palmitoleic acid, lineolic acid, arachidonic acid, oleic acid, or erucic acid ($R^5$ is a —$C_1$ to $C_{30}$ linear or branched alkyl optionally comprising at least one unsaturated group); hydroxy-containing acids such as hydroxycaprylic acid, hydroxycapric acid, hydroxylauric acid, hydroxymysteric acid, hydroxypalmitic acid, hydroxystearic acid, hydroxyarachidic acid, hydroxybehenic acid, hydroxylignoceric acid, hydroxypalmitoleic acid, hydroxylineolic acid, hydroxyarachidonic acid, hydroxyoleic acid, or hydroxyerucic acid ($R^5$ is a hydroxy-functional $C_1$ to $C_{30}$ linear or branched alkyl); and mercaptoalkanoic acids such as mercaptopropionic acid ($R^5$ is a thiol-functional $C_1$ to $C_{30}$ linear or branched alkyl).

Where isocyanate-reactive group X is —SH, specific examples of Formula (IIIa) include but are not limited to alkyl thiols such as lauryl mercaptan or dodecyl mercaptan ($R^5$ is a —$C_1$ to $C_{30}$ linear or branched alkyl optionally comprising at least one unsaturated group). Where isocyanate-reactive group X is —NH($R^{12}$), specific examples of Formula (IIIa) include but are not limited to alkyl amines such as diisopropylamine, propylamine, hexylmine, or laurylamine ($R^5$ is a —$C_1$ to $C_{30}$ linear or branched alkyl optionally comprising at least one unsaturated group); alkanolamines such as ethanolamine or propanolamine ($R^5$ is a hydroxy-functional $C_1$ to $C_{30}$ linear or branched alkyl); silicone prepolymer polyamines ($R^5$ is a amine-functional linear or branched organosiloxane); alkyl diamines ($R^5$ is an amine-functional $C_1$ to $C_{30}$ linear or branched alkyl); and aminoalkanesulfonic acids such as 2-aminoethanesulfonic acid ($R^5$ is HO—S(O)$_2$ $R^{10}$—).

In a further embodiment, the second compound (c) of the extender polymer is of formula (IIIb). These compounds are commonly referred to as polyglycerols. These polyglycerols can be present where $R^{15}$, $R^{16}$, and $R^{17}$ are each independently a —H; —$R^{18}$; —C(O)$R^{18}$ provided that at least one $R^{15}$, $R^{16}$, or $R^{17}$ is a —H; and wherein $R^{18}$ is independently a linear or branched alkyl group having 5 to 29 carbons optionally comprising at least 1 unsaturated bond. Specific examples include but are not limited to triglycerol monostearate, triglycerol distearate, hexaglycerol monostearate, hexaglycerol distearate, decaglyceryl mono(carpylate/caprate), decaglyceryl di(carpylate/caprate), decaglycerol, polyglycerol-3, and C18 diglyceride.

In one embodiment, the reaction product of (a) an isocyanate-containing compound with (b) an isocyanate-reactive compound contains unreacted isocyanate groups which are further reacted with multiple second compounds (c) comprising both compounds of formula (IIIa) or (IIIb) and water. Water is used to cross-link unreacted isocyanates to creates urea linkages.

The polymer extender compounds of the present invention can be made in one step. The polymer extender compounds of the present invention comprising more than one organic compound of Formula (Ia), (Ib), or (Ic) and/or on or more second compounds (c) can be also made in one step. Preferably, if more than one organic compounds of Formula (Ia), (Ib), or (Ic) and/or on or more second compounds (c) are used, then the synthesis can be completed sequentially. A sequential addition is especially useful when employing compounds of Formula (Ia), (Ib), or (Ic) with high OH numbers, or when using polyfunctional compounds (c). These steps comprise reacting (a) at least one isocyanate group-containing compound selected from isocyanate, diisocyanate, polyisocyanate, or mixture thereof, and (b) at least one isocyanate-reactive compound selected from formula (Ia), (Ib), or (Ic) wherein each R is independently a —H; —$R^1$; —C(O)$R^1$; —(CH$_2$CH$_2$O)$_n$(CH(CH$_3$)CH$_2$O)$_m R^2$; or —(CH$_2$CH$_2$O)$_n$(CH(CH$_3$)CH$_2$O)$_m$C(O)$R^1$; each n is independently 0 to 20; each m is independently 0 to 20; m+n is greater than 0; each $R^1$ is independently a linear or branched alkyl group having 5 to 29 carbons optionally comprising at least 1 unsaturated bond; each $R^2$ is independently —H, or a linear or branched alkyl group having 6 to 30 carbons optionally comprising at least 1 unsaturated bond; or a mixtures thereof, provided that when the compound is of Formula (Ia) then at least one of R or $R^2$ is —H; each $R^3$ is independently a —H; —$R^1$; —C(O)$R^1$; —(CH$_2$CH$_2$O)$_n$(CH(CH$_3$)CH$_2$O)$_m R^2$; or —(CH$_2$CH$_2$O)$_n$(CH(CH$_3$)CH$_2$O)$_m$C(O)$R^1$; each $R^4$ is independently —H, a linear or branched alkyl group having 6 to 30 carbons optionally comprising at least 1 unsaturated bond, or combinations thereof; —(CH$_2$CH$_2$O)$_n$(CH(CH$_3$)CH$_2$O)$_m R^2$; or —(CH$_2$CH$_2$O)$_n$(CH(CH$_3$)CH$_2$O)$_m$C(O)$R^1$; each n' is independently 0 to 20; each m' is independently 0 to 20; m'+n' is greater than 0; provided when the compound is Formula (Ib), then at least one $R^2$, $R^3$ or $R^4$ is a —H; and each $R^{19}$ is —H, —C(O)$R^1$, or —CH$_2$C[CH$_2$OR]$_3$, provided when the compound is Formula (Ic), then at least one $R^{19}$ or R is —H. When a second compound (c) is used, molar concentrations of the at least one compound selected from Formula (Ia), (Ib), or (Ic) are such that there remains unreacted isocyanate groups to react with the one or more second compound(s) (c).

The at least one isocyanate, diisocyanate, polyisocyanate, or mixture thereof, and at least one isocyanate group-containing compound selected from isocyanate, diisocyanate, polyisocyanate, or mixture thereof, and (b) at least one isocyanate-reactive compound selected from formula (Ia), (Ib), or (Ic), or mixture thereof, are reacted. This reaction is typically conducted by charging a reaction vessel with the isocyanate, diisocyanate, or polyisocyanate, and at least one compound selected from formula (Ia), (Ib), or (Ic), or mixture thereof, and optionally a second compound (c). The order of reagent addition is not critical, but if water is used, the water should be added after the isocyanates and at least one compound selected from formula (Ia), (Ib), or (Ic), or mixture thereof are reacted.

The specific weight of the reactants charged is based on their equivalent weights and on the working capacity of the reaction vessel, and is adjusted so that compound selected from formula (Ia), (Ib), or (Ic) will be consumed in the first step. A suitable dry organic solvent free of isocyanate-reactive groups is typically used as a solvent. Ketones are the preferred solvents, and methylisobutylketone (MIBK) is particularly preferred for convenience and availability. The charge is agitated, and temperature adjusted to about 40° C. to 70° C. Typically, a catalyst such as iron(III) chloride in an organic solvent is then added, typically in an amount of from about 0.01 to about 1.0 weight % based on the dry weight of the composition, and the temperature is raised to about 80° C. to 100° C. A co-catalyst, such as sodium carbonate, may also be used. If water is to be added, the initial reaction is conducted so that less than 100% of the isocyanate groups are reacted. In the second step after holding for several hours, additional solvent, water, and optionally a second compound (c) are added, and the mixture is allowed to react for several more hours or until all of the isocyanate has been reacted.

The extender compositions as described above are then blended with any of a variety of known treating agents for fibrous substrates, preferably in a weight ratio of extender: treating agent from about 1:10 to about 10:1, more preferably a ratio of from about 1:8 to 5:1, and most preferably in a ratio of from about 1:6 to 10:3. Examples include no iron, easy to iron, shrinkage control, wrinkle free, permanent press, moisture control, softness, strength, anti-slip, anti-static, anti-snag, anti-pill, stain repellency, stain release, soil repellency, soil release, water repellency, oil repellency, odor control, antimicrobial, sun protection, and similar effects. Preferred treating agents are any of those used for creating water or oil repellency on a fibrous substrate. Such materials can be in the form of non-fluorinated cationic acrylic polymers, non-fluorinated anionic acrylic polymers, non-fluorinated nonionic acrylic polymers, partially fluorinated urethanes, cationic partially fluorinated acrylic polymers or copolymers, non-ionic partially fluorinated acrylic polymers or copolymers, partially fluorinated acrylamide polymers or copolymers, silicones, or parafins.

Of particular interest are fluorinated polymers useful as treating agents to provide repellency properties to the surface of treated substrates. These include fluorochemical compounds or polymers containing one or more fluoroaliphatic groups (designated here as $R_f$ groups) which are fluorinated, stable, inert, and non-polar, preferably saturated, monovalent, and both oleophobic and hydrophobic. The $R_f$ groups contain at least 3 carbon atoms, preferably 3 to 20 carbon atoms, more preferably 4 to 12 carbon atoms, and most preferably about 4 to about 6 carbon atoms. The $R_f$ groups may contain straight or branched chain or cyclic fluorinated alkylene groups or combinations thereof. The terminal portion of the $R_f$ groups is preferably a perfluorinated aliphatic group of the formula $C_nF_{2n+1}$ wherein n is from about 3 to about 20. Examples of fluorinated polymer treating agents are CAPSTONE and ZONYL available from E. I. du Pont de Nemours and Company, Wilmington, Del.; ASAHI GARD from Asahi Glass Company, Ltd., Tokyo, Japan; UNIDYNE from Daikin America, Inc., Orangeburg, N.Y.; SCOTCHGARD from 3M Company, St. Paul, Minn.; and NANO TEX from Nanotex, Emeryville, Calif.

Examples of such fluorinated polymers preferably include Rf-containing polyurethanes and poly(meth)acrylates. Especially preferred are copolymers of fluorochemical (meth)acrylate monomers with a co-polymerizable monovinyl compound or a conjugated diene. The co-polymerizable monovinyl compounds include alkyl (meth)acrylates, vinyl esters of aliphatic acids, styrene and alkyl styrene, vinyl halides, vinylidene halides, alkyl esters, vinyl alkyl ketones, and acrylamides. The conjugated dienes are preferably 1,3-butadienes. Representative compounds within the preceding classes include the methyl, propyl, butyl, 2-hydroxypropyl, 2-hydroxyethyl, isoamyl, 2-ethylhexyl, octyl, decyl, lauryl, cetyl, and octadecyl acrylates and methacrylates; vinyl acetate, vinyl propionate, vinyl caprylate, vinyl laurate, vinyl stearate, styrene, alpha methyl styrene, p-methylstyene, vinyl fluoride, vinyl chloride, vinyl bromide, vinylidene fluoride, vinylidene chloride, allyl heptanoate, allyl acetate, allyl caprylate, allyl caproate, vinyl methyl ketone, vinyl ethyl ketone, 1,3-butadiene, 2-chloro-1,3-butadiene, 2,3-dichloro-1,3-butadiene, isoprene, N-methylolacrylamide, N-methylolmethacrylamide, glycidyl acrylate, glycidyl methacrylate, amine-terminated (meth)acrylates, and polyoxy(meth)acrylates.

The blended composition comprising a treating agent and the extender compositions of the present invention applied to the fibrous substrate optionally further comprises a blocked isocyanate to promote durability, added after copolymerization (i.e., as a blended isocyanate). An example of a suitable blocked isocyanate is PHOBOL XAN available from Huntsman Corp, Salt Lake City, Utah Other commercially available blocked isocyanates are also suitable for use herein. The desirability of adding a blocked isocyanate depends on the particular application for the copolymer. For most of the presently envisioned applications, it does not need to be present to achieve satisfactory cross-linking between chains or bonding to the fibers. When added as a blended isocyanate, amounts up to about 20% by weight are added.

The blended composition comprising a treating agent and the extender composition of the present invention optionally further comprises additional components such as additional treating agents or finishes to achieve additional surface effects, or additives commonly used with such agents or finishes. Such additional components comprise compounds or compositions that provide surface effects such as no iron, easy to iron, shrinkage control, wrinkle free, permanent press, moisture control, softness, strength, anti-slip, anti-static, anti-snag, anti-pill, stain repellency, stain release, soil repellency, soil release, water repellency, oil repellency, odor control, antimicrobial, sun protection, and similar effects. One or more such treating agents or finishes can be combined with the blended composition and applied to the fibrous substrate. Other additives commonly used with such treating agents or finishes may also be present such as surfactants, pH adjusters, cross linkers, wetting agents, and other additives known by those skilled in the art. Further, other extender compositions are optionally included to obtain a combination of benefits.

For example, when synthetic fabrics are treated, a wetting agent can be used, such as ALKANOL 6112 available from E. I. du Pont de Nemours and Company, Wilmington, Del. As a further example, when cotton or cotton-blended fabrics are treated, a wrinkle-resistant resin can be used such as PERMAFRESH EFC available from Emerald Carolina, LLC, Cahrlotte, N.C. As a further example, when nonwoven fabrics are treated, a wax extender can be employed such as FREEPEL 1225WR, available from Omnova Solutions Chester, S.C. An antistat such as ZELEC KC, available from Stepan, Northfield, Ill., or a wetting agent, such as hexanol, also are suitable. The dispersions are generally applied to fibrous substrates by spraying, dipping, padding, or other well-known methods. After excess liquid has been removed, for example by squeeze rolls, the treated fibrous substrate is dried and then cured by heating, for example, to from about 100° C. to about 190° C., for at least 30 seconds, typically from about 60 to about 240 seconds. Such curing enhances oil-, water- and soil repellency and durability of the repellency. While these curing conditions are typical, some commercial apparatus may operate outside these ranges because of its specific design features.

The present invention further comprises substrates treated with the above-described composition comprising i) a treating agent which provides a surface effect and ii) the extender compounds as described above. The composition also can contain optional agents to provide additional surface effects as described above, optional additives commonly used in treating substrates as described above, optional blocked isocyanate as described above, and optional additional distinct extender compositions. As previously noted such substrates include paper, nonwovens, leather, fibers, textiles, fabrics, fabric blends, or combinations thereof. "Fabrics" includes natural or synthetic fabrics composed of fibers of cotton, rayon, silk, wool, polyester, polypropylene, polyolefins, nylon, and aramids such as "NOMEX" and "KEVLAR." By "fabric blends" is meant fabric made of two or more types of fibers. Typically these blends are a combination of at least one natural fiber and at least one synthetic fiber, but also can be a blend of two or more natural fibers or of two or more synthetic fibers. Preferably, the substrate has been treated with a composition comprising an extender composition of the present invention and a fluorinated polymer such as a polyurethane or poly(meth)acrylate.

Specifically, the method and treated substrates of the present invention are useful to enhance surface properties, especially durability of oil-, water- and soil-repellency, of the above-described substrates while reducing the amount of fluorinated polymer employed. The repellency property is more durable than applications of fluorinated polymer treating agents with other extenders, and is effective for various fibrous substrates. The repellency property is effective with a variety of other surface effects. The treated fibrous substrates of the present invention are useful in a variety of applications such as for textiles, clothing, uniforms, protective garments, furnishings, and the like. The extender composition of the present invention are advantageous in that when blended with fluorinated polymer treating agents, they give highly durable, low yellowing repellent finishes over a wide range of fibrous substrates while using a reduced level of the fluorinated polymer.

Test Methods

All solvents and reagents, unless otherwise indicated, were purchased from Sigma-Aldrich, St. Louis, Mo., and used directly as supplied. Sorbitan tristearate was obtained from Croda, East Yorkshire, England and DuPont Nutrition & Health, Copenhagen, Denmark. DESMODUR N-100 was obtained from Bayer Corporation, Pittsburgh, Pa. ARMEEN DM-18D was obtained from Akzo-Nobel, Bridgewater, N.J. PHOBOL XAN was obtained from Huntsman Corp, Salt Lake City, Utah The cationic dispersed non-fluorinated acrylic copolymer (repellent product), cationic self-dispersed fluorinated (meth)acrylate/amine-terminated (meth)acrylate/reactive (meth)acrylate copolymer (water repellent and stain release agent), and cationic dispersed partially fluorinated (meth)acrylate/vinylidene chloride/alkyl (meth)acrylate copolymer (water repellent agent) are commercially available from DuPont de Nemours, Wilmington, Del.

The following tests were employed in evaluating the examples herein.

Test Method 1—Fabric Treatment

The fabrics treated in this study were 100% by weight khaki cotton twill available from SDL Atlas Textile Testing Solutions, Rock Hill, S.C. 29732 and 100% by weight red polyester fabric available from L. Michael OY, Finland. The fabric was treated with the aqueous dispersions various emulsion polymer using a conventional pad bath (dipping) process. The prepared concentrated dispersion of the polymer emulsions were diluted with deionized water to achieve a pad bath having 60 g/L of the final emulsion in the bath. For the treatment of the cotton fabric, a wetting agent, INVADINE PBN and a catalyzed cross-linking agent, KNITTEX 7636 (all available from Huntsman, Salt Lake City, Utah) were also included in the bath at 5 g/L and 30 g/L respectively. The fabric was padded in the bath, and the excess liquid was removed by squeeze rollers. The wet pickup was around 95% on the cotton substrate. The "wet pick up" is the weight of the bath solution of the emulsion polymer and additives applied to the fabric, based on the dry weight of the fabric. The fabric was cured at approximately 165° C. for 3 minutes and allowed to "rest" after treatment and cure for at least 2 hours.

For the treatment of the polyester fabric, a wetting agent, INVADINE® PBN (available from Huntsman, Charlotte, N.C., USA) and 20% acetic acid were also included in the bath at 5 g/L and 1 g/L respectively. The fabric was padded in the bath, and the excess liquid removed by squeeze rollers. The wet pickup was around 55% on the polyester substrate. The "wet pick up" is the weight of the bath solution of the emulsion polymer and additives applied to the fabric, based on the dry weight of the fabric. The fabric was cured at approximately 160° C. for 2 minutes and allowed to "rest" after treatment and cure for about 15 to about 18 hours.

Test Method 2—Water Drop Repellency

The water repellency of a treated textile substrate was measured according to AATCC standard Test Method No. 193 and the method outlined in the *Teflon® Global Specifications and Quality Control Tests* booklet.

Test Method 3—Water Spray Repellency

Water repellency was further tested by utilizing the spray test method which is a measure of dynamic water repellency. The treated fabric samples were tested for water repellency according to AATCC standard Test Method No. 22 and the method outlined in the *Teflon® Global Specifications and Quality Control Tests* booklet.

Test Method 4—Oil Repellency

The treated fabric samples were tested for oil repellency by a modification of AATCC standard Test Method No. 118, and the method outlined in the *Teflon® Global Specifications and Quality Control Tests* booklet.

Test Method 4—Bundesmann Absorbency

The treated fabric samples were tested for dynamic water absorbency after 30 homewashes following ISO 9865 standard Test Method.

Test Method 5—Abrasion Test Method

The treated fabric samples were tested for abrasion using modified AATCC standard Test Method No. 8, and the method outlined in the *Teflon® Global Specifications and Quality Control Tests* booklet.

Test Method 6—Wash Durability

The fabric samples were laundered according to International Standard specified domestic washing procedure for textile testing. Fabric samples were loaded into a horizontal drum, front-loading type (Type A, WASCATOR FOM 71MP-Lab) of automatic washing machine with a ballast load to give a total dry load of 4 lb. A commercial detergent was added (AATCC 1993 standard Reference Detergent WOB) and the washer program ISO 7A was used. After washing was complete, the entire load was placed into a KENMORE automatic dryer and dried on high for 45-50 min.

EXAMPLES

Formulation Compositions

Formulations were made using the ingredients listed in Tables 1, 4, 7, and 10. Ingredients were added to a glass bottle and stirred for 5 minutes to ensure sufficient mixing.

Urethane Based Extender 1

In a 4-neck round bottom flask equipped with an overhead stirrer, thermocouple, dean-stark/condenser was added sorbitan tristearate (116.0 g; Hydroxy Number=77.2 mgKOH/g) and 4-methyl-2-pentanone (MIBK, 150 g). The solution was heated to 50° C. and DESMODUR N-100 (30 g) was added followed by a catalyst and the solution was heated to 80° C. over one hour.

Urethane Based Extender 2

In a 4-neck round bottom flask equipped with an overhead stirrer, thermocouple, dean-stark/condenser was added sorbitan tristearate (116.0 g; Hydroxy Number=77.2 mgKOH/g) and 4-methyl-2-pentanone (MIBK, 150 g). The solution was refluxed for 1 hour to remove any residual moisture. After the hour, the solution was cooled to 50° C. and DESMODUR N-100 (30 g) was added followed by a catalyst and the solution was heated to 80° C. over one hour.

Urethane Based Extender 3

In a 4-neck round bottom flask equipped with an overhead stirrer, thermocouple, dean-stark/condenser was added sorbitan tristearate (125.4 g; Hydroxy Number=69.5 mgKOH/g) and 4-methyl-2-pentanone (MIBK, 150 g). The solution was refluxed for 1 hour to remove any residual moisture. After the hour, the solution was cooled to 50° C. and DESMODUR N-100 (30 g) was added followed by a catalyst and the solution was heated to 80° C. over one hour.

Urethane Based Extender 4

In a 4-neck round bottom flask equipped with an overhead stirrer, thermocouple, dean-stark/condenser was added sorbitan tristearate (127.5 g; Hydroxy Number=69.0 mgKOH/g) and 4-methyl-2-pentanone (MIBK, 150 g). The solution was refluxed for 1 hour to remove any residual moisture. After the hour, the solution was cooled to 50° C. and DESMODUR N-100 (30 g) was added followed by a catalyst and the solution was heated to 80° C. over one hour.

Urethane Based Extender 5

In a 4-neck round bottom flask equipped with an overhead stirrer, thermocouple, dean-stark/condenser was added sorbitan tristearate (120.5 g; Hydroxy Number=70.5 mgKOH/g) and 4-methyl-2-pentanone (MIBK, 150 g). The solution was refluxed for 1 hour to remove any residual moisture. After the hour, the solution was cooled to 50° C. and DESMODUR N-100 (30 g) was added followed by a catalyst and the solution was heated to 80° C. over one hour.

Urethane Based Extender 6

In a 4-neck round bottom flask equipped with an overhead stirrer, thermocouple, dean-stark/condenser was added sorbitan tristearate (126.4 g of mixed sorbitan stearate esters; Hydroxy Number=69.2 mgKOH/g) and 4-methyl-2-pentanone (MIBK, 150 g). The solution was refluxed for 1 hour to remove any residual moisture. After the hour, the solution was cooled to 50° C. and DESMODUR N-100 (30 g) was added followed by a catalyst and the solution was heated to 80° C. over one hour.

Urethane Based Extender Dispersion

Aqueous dispersions of Urethane Based Extenders 1-6, described above, were prepared. Water (300 g), ARMEEN DM-18D (5.6 g), TERGITOL TMN-10 (2.8 g), and acetic acid (3.4 g) was added to a beaker and stirred to from a surfactant solution. The solution as heated to 60° C. The sorbitan urethane/MIBK solution, prepared as described above (Urethane Based Extenders 1-6), was cooled to 60° C. and the surfactant solution was added slowly to produce a milky emulsion. Following homogenization at 6000 psi, the emulsion was distilled under reduced pressure to remove the solvent, yielding non-flammable urethane dispersion at 25% solids.

Examples 1 to 5

Examples 1 to 5 were prepared by adding a dispersion of Urethane Based Extender 1 to a cationic dispersed partially fluorinated (meth)acrylate/vinylidene chloride/alkyl (meth)acrylate copolymer (water repellent agent) at various ratios as described in Table 1. A blocked isocyanate was also added to the dispersion. The examples were applied to khaki cotton and polyester substrates and tested according to the test methods as described above. Results can be found in Tables 2 and 3.

Comparative Example A

Comparative Example A was prepared by adding a dispersion of Urethane Based Extender 1 to a blocked isocyanate according to the amounts in Table 1. The examples were applied to khaki cotton and polyester substrates and tested according to the test methods as described above. Results can be found in Tables 2 and 3.

Comparative Example B

Comparative Example B was prepared by using the fluorinated copolymer used in Examples 1 to 5 but excluded the urethane based extender and diluted to the same fluorinated content as Example 1. The comparative example A was applied to khaki cotton and polyester substrates and tested according to the test methods as described above. Results can be found in Tables 2 and 3.

Comparative Example C

Comparative Example C was repeat of Example 1 except that a commercially available cationic dispersed non-fluorinated acrylic copolymer (repellent product) was used in place of Urethane Based Extender 1. The comparative example C was applied to khaki cotton and polyester substrates and tested according to the test methods as described above. Results can be found in Tables 2 and 3.

TABLE 1

Extender Compositions of Examples 1 to 5 and Comparative Examples A to C.

| Example No. | Fluorinated Copolymer | Urethane Based Extender 1 | PHOBOL XAN | Water | % F |
|---|---|---|---|---|---|
| 1 | 50 | 30.0 | 5.0 | 15.0 | 5.75 |
| 2 | 40 | 40.0 | 5.0 | 15.0 | 4.60 |
| 3 | 30 | 50.0 | 5.0 | 15.0 | 3.45 |
| 4 | 20 | 60.0 | 5.0 | 15.0 | 2.30 |
| 5 | 10 | 70.0 | 5.0 | 15.0 | 1.15 |
| Comparative Example A | 0 | 80.0 | 5.0 | 15.0 | 0.0 |
| Comparative Example B | 50 | 0 | 0[a] | 50 | 5.75 |
| Comparative Example C | 50 | 30.0 (non-fluorinated polyacrylate extender) | 5.0 | 15.0 | 5.75 |

[a] 10 g/L PHOBOL XAN added to pad bath for Comparative Example B.

TABLE 2

Performance results of Examples 1 to 5 and Comparative Examples A to C on khaki bottom-weight cotton, 60 g/L loading

| | Ex 1 | Ex 2 | Ex 3 | Ex 4 | Ex 5 | Comp. Ex. A | Comp. Ex. B | Comp. Ex. C |
|---|---|---|---|---|---|---|---|---|
| Water Drop | | | | | | | | |
| Initial | 6 | 6 | 6 | 6 | 6 | 4 | 6 | 6 |
| 30 HW | 6 | 6 | 6 | 6 | 6 | 4 | 6 | 6 |
| 10x abrasion | 6 | 6 | 6 | 6 | 6 | 4 | 6 | 6 |
| 20x abrasion | 6 | 6 | 6 | 6 | 5 | 4 | 6 | 6 |
| 30x abrasion | 6 | 6 | 6 | 6 | 5 | 4 | 6 | 6 |
| Oil Rating | | | | | | | | |
| Initial | 5.5 | 5.5 | 5.5 | 5.5 | 5 | 0 | 5.5 | 5.5 |
| 30 HW | 5.5 | 5.5 | 5.5 | 5.5 | 5 | 0 | 5.5 | 5.5 |
| 10x abrasion | 4 | 3 | 2 | 2 | 1 | 0 | 5.5 | 5.5 |
| 20x abrasion | 3 | 2 | 2 | 1 | 0 | 0 | 5 | 4 |
| 30x abrasion | 2 | 2 | 1 | 1 | 0 | 0 | 3 | 3 |
| Spray Rating | | | | | | | | |
| Initial | 100 | 100 | 100 | 100 | 100 | 100 | 100 | 100 |
| 30 HW | 85 | 85 | 85 | 85 | 85 | 80 | 90 | 80 |
| Bundesmann after 30 HW | | | | | | | | |
| % Absorbance | 18.82 | 26.93 | 27.43 | 29.27 | 32.63 | 34.44 | 32.21 | 48.72 |

TABLE 3

Performance results Examples 1 to 5 and Comparative Examples A to C on red polyester, 60 g/L loading

| | Ex 1 | Ex 2 | Ex 3 | Ex 4 | Ex 5 | Comp. Ex. A | Comp. Ex. B | Comp. Ex. C |
|---|---|---|---|---|---|---|---|---|
| Water Drop | | | | | | | | |
| Initial | 6 | 6 | 6 | 6 | 6 | 4 | 6 | 6 |
| 30 HW | 6 | 6 | 6 | 6 | 6 | 4 | 6 | 6 |
| 10x abrasion | 6 | 6 | 5 | 5 | 5 | 4 | 6 | 6 |
| 20x abrasion | 6 | 6 | 5 | 5 | 4 | 4 | 6 | 6 |
| 30x abrasion | 5 | 5 | 5 | 4 | 4 | 3 | 6 | 6 |
| Oil Rating | | | | | | | | |
| Initial | 5 | 5 | 5 | 5 | 3 | 0 | 5 | 5 |
| 30 HW | 5 | 5 | 5 | 5 | 3 | 0 | 5 | 5 |
| 10x abrasion | 3 | 3 | 2 | 1 | 1 | 0 | 3 | 5 |
| 20x abrasion | 3 | 2 | 1 | 1 | 1 | 0 | 3 | 4 |
| 30x abrasion | 2 | 2 | 1 | 0 | 0 | 0 | 3 | 4 |
| Spray Rating | | | | | | | | |
| Initial | 100 | 100 | 100 | 100 | 100 | 100 | 100 | 100 |
| 30 HW | 100 | 100 | 100 | 90 | 90 | 100 | 100 | 100 |

TABLE 3-continued

Performance results Examples 1 to 5 and Comparative Examples A to C on red polyester, 60 g/L loading

|  | Ex 1 | Ex 2 | Ex 3 | Ex 4 | Ex 5 | Comp. Ex. A | Comp. Ex. B | Comp. Ex. C |
|---|---|---|---|---|---|---|---|---|
|  | Bundesmann after 30 HW | | | | | | | |
| % Absorb. | 2.72 | 4.18 | 4.05 | 10.76 | 11.83 | 7.48 | 7.88 | 12.06 |

Examples 6 to 10

Examples 6 to 10 were prepared by adding a dispersion of Urethane Based Extender 1 to a cationic self-dispersed fluorinated (meth)acrylate/amine-terminated (meth)acrylate/reactive (meth)acrylate copolymer (water repellent and stain release agent) at various ratios as described in Table 4. A blocked isocyanate was also added to the dispersion. The examples were applied to khaki cotton and polyester substrates and tested according to the test methods as described above. Results can be found in Tables 5 and 6.

Comparative Examples D to F

Comparative Examples D to F were prepared by adding a dispersion of Urethane Based Extender 1, a cationic self-dispersed fluorinated (meth)acrylatelamine-terminated (meth)acrylate/reactive (meth)acrylate copolymer (water repellent and stain release agent), and a blocked isocyanate according to the amounts in Table 4. The examples were applied to khaki cotton and polyester substrates and tested according to the test methods as described above. Results can be found in Tables 5 and 6.

TABLE 4

Extender Compositions for Examples 6 to 10 and Comparative Examples D to F.

| Example No. | Wt. % Component | | | | |
|---|---|---|---|---|---|
|  | Fluorinated Copolymer | Urethane Based Extender 1 | PHOBOL XAN | Water | % F |
| 6 | 50 | 30 | 5.0 | 15.0 | 3.4 |
| 7 | 40 | 40 | 5.0 | 15.0 | 2.7 |
| 8 | 30 | 50 | 5.0 | 15.0 | 2.0 |
| 9 | 20 | 60 | 5.0 | 15.0 | 1.4 |
| 10 | 10 | 70 | 5.0 | 15.0 | 0.7 |
| Comparative Example D | 0 | 80 | 5.0 | 15.0 | 0.0 |
| Comparative Example E | 80 | 0 | 5.0 | 15.0 | 6.8 |
| Comparative Example F | 50 | 0 | 0[a] | 50 | 3.4 |

[a] 10 g/L PHOBOL XAN added to pad bath for Comparative Example F.

TABLE 5

Performance results for Examples 6 to 10 and Comparative Examples D to F on khaki bottom-weight cotton, 60 g/L loading

|  | Ex 6 | Ex 7 | Ex 8 | Ex 9 | Ex 10 | Comp. Ex. D | Comp. Ex. E | Comp. Ex. F |
|---|---|---|---|---|---|---|---|---|
| Water Drop | | | | | | | | |
| Initial | 3 | 3 | 3 | 3 | 3 | 3 | 3 | 3 |
| 30 HW | 3 | 3 | 3 | 3 | 3 | 3 | 3 | 3 |
| 10x abrasion | 3 | 3 | 3 | 3 | 3 | 3 | 3 | 3 |
| 20x abrasion | 3 | 3 | 3 | 3 | 3 | 3 | 3 | 3 |
| 30x abrasion | 3 | 3 | 3 | 3 | 3 | 3 | 3 | 3 |
| Oil Rating | | | | | | | | |
| Initial | 5 | 4 | 4 | 3 | 1 | 0 | 6 | 5 |
| 30 HW | 3 | 2 | 2 | 1 | 0 | 0 | 5 | 4 |
| 10x abrasion | 2 | 1 | 1 | 1 | 0 | 0 | 5 | 3 |
| 20x abrasion | 2 | 1 | 1 | 1 | 0 | 0 | 5 | 3 |
| 30x abrasion | 2 | 1 | 1 | 1 | 0 | 0 | 5 | 3 |
| Spray Rating | | | | | | | | |
| Initial | 70 | 80 | 70 | 70 | 75 | 100 | 80 | 80 |
| 30 HW | 70 | 80 | 80 | 75 | 80 | 100 | 80 | 70 |
| Corn Oil Stain Release Ratings | | | | | | | | |
| Initial | 2 | 2 | 2 | 1 | 1 | 1 | 3 | 2 |
| 30 HW | 1 | 1 | 1 | 1 | 1 | 1 | 5 | 3.5 |
| Mineral Oil Stain Release Ratings | | | | | | | | |
| Initial | 2 | 2 | 1 | 1 | 1 | 1 | 3.5 | 3 |
| 30 HW | 1 | 1 | 1 | 1 | 1 | 1 | 4.5 | 4 |

TABLE 6

Performance results for Examples 6 to 10 and Comparative Examples D to F on red polyester, 60 g/L loading

|  | Ex 6 | Ex 7 | Ex 8 | Ex 9 | Ex 10 | Comp. Ex. D | Comp. Ex. E | Comp. Ex. F |
|---|---|---|---|---|---|---|---|---|
| Water Drop | | | | | | | | |
| Initial | 2 | 2 | 2 | 2 | 2 | 3 | 3 | 3 |
| 30 HW | 3 | 3 | 3 | 3 | 3 | 3 | 3 | 3 |
| 10x abrasion | 3 | 3 | 3 | 3 | 0 | 0 | 3 | 3 |
| 20x abrasion | 3 | 3 | 3 | 3 | 0 | 0 | 3 | 3 |
| 30x abrasion | 3 | 3 | 3 | 3 | 0 | 0 | 3 | 3 |
| Oil Rating | | | | | | | | |
| Initial | 5 | 5 | 5 | 4 | 2 | 0 | 5 | 5 |
| 30 HW | 4 | 3 | 3 | 2 | 0 | 0 | 5 | 4 |
| 10x abrasion | 1 | 1 | 1 | 0 | 0 | 0 | 4 | 3 |
| 20x abrasion | 1 | 1 | 0 | 0 | 0 | 0 | 3 | 2 |
| 30x abrasion | 1 | 1 | 0 | 0 | 0 | 0 | 3 | 2 |
| Spray Rating | | | | | | | | |
| Initial | 50 | 50 | 30 | 30 | 30 | 100 | 70 | 60 |
| 30 HW | 70 | 70 | 60 | 60 | 80 | 100 | 75 | 75 |
| Corn Oil Stain Release Ratings | | | | | | | | |
| Initial | 3.5 | 3 | 2 | 2 | 1 | 1 | 5 | 3 |
| 30 HW | 2 | 1 | 2 | 1 | 1 | 1 | 3 | 2 |
| Mineral Oil Stain Release Ratings | | | | | | | | |
| Initial | 2 | 1 | 2 | 1 | 1 | 1 | 1 | 1 |
| 30 HW | 1 | 1 | 2 | 1 | 1 | 1 | 1 | 1 |

Examples 11 to 15

Examples 11 to 15 were prepared by adding a dispersion of Urethane Based Extender 2 to a cationic self-dispersed fluorinated (meth)acrylate/amine-terminated (meth)acrylate/reactive (meth)acrylate copolymer (water repellent and stain release agent) at various ratios as described in Table 7. A blocked isocyanate was also added to the dispersion. The examples were applied to khaki cotton and polyester substrates and tested according to the test methods as described above. Results can be found in Tables 8 and 9.

Comparative Examples G to I

Comparative Examples G to I were prepared by adding a dispersion of Urethane Based Extender 2, a cationic self-dispersed fluorinated (meth)acrylate/amine-terminated (meth)acrylate/reactive (meth)acrylate copolymer (water repellent and stain release agent), and a blocked isocyanate according to the amounts in Table 7. The examples were applied to khaki cotton and polyester substrates and tested according to the test methods as described above. Results can be found in Tables 8 and 9.

TABLE 7

Extender Compositions for Examples 11 to 15 and Comparative Examples G to I.

| | Wt. % Component | | | | |
|---|---|---|---|---|---|
| Example No. | Fluorinated Copolymer | Urethane Based Extender 2 | PHOBOL XAN | Water | % F |
| 11 | 50 | 30 | 5.0 | 15.0 | 5.3 |
| 12 | 40 | 40 | 5.0 | 15.0 | 4.2 |
| 13 | 30 | 50 | 5.0 | 15.0 | 3.2 |
| 14 | 20 | 60 | 5.0 | 15.0 | 2.1 |
| 15 | 10 | 70 | 5.0 | 15.0 | 1.1 |
| Comparative Example G | 0 | 80 | 5.0 | 15.0 | 0.0 |
| Comparative Example H | 100 | 0 | 0[a] | 0 | 10.5 |
| Comparative Example I | 50 | 0 | 0[a] | 50 | 5.3 |

[a] 10 g/L PHOBOL XAN added to pad bath for Comparative Examples H and I.

TABLE 8

Performance results for Examples 11 to 15 and Comparative Examples G to I on khaki bottom-weight cotton, 60 g/L loading

|  | Ex 11 | Ex 12 | Ex 13 | Ex 14 | Ex 15 | Comp. Ex. G | Comp. Ex. H | Comp. Ex. I |
|---|---|---|---|---|---|---|---|---|
| Water Drop | | | | | | | | |
| Initial | 6 | 5 | 5 | 5 | 5 | 4 | 6 | 6 |
| 30 HW | 5 | 5 | 5 | 5 | 5 | 4 | 5 | 5 |
| 10x abrasion | 5 | 4 | 4 | 4 | 4 | 4 | 6 | 6 |
| 20x abrasion | 5 | 4 | 4 | 4 | 4 | 4 | 6 | 6 |
| 30x abrasion | 5 | 4 | 4 | 4 | 4 | 4 | 6 | 6 |

TABLE 8-continued

Performance results for Examples 11 to 15 and Comparative Examples
G to I on khaki bottom-weight cotton, 60 g/L loading

|  | Ex 11 | Ex 12 | Ex 13 | Ex 14 | Ex 15 | Comp. Ex. G | Comp. Ex. H | Comp. Ex. I |
|---|---|---|---|---|---|---|---|---|
| Oil Rating | | | | | | | | |
| Initial | 4 | 4 | 4 | 3 | 3 | 0 | 5 | 5 |
| 30 HW | 2 | 2 | 2 | 1 | 1 | 0 | 3 | 2 |
| 10x abrasion | 2 | 1 | 1 | 1 | 1 | 0 | 3 | 3 |
| 20x abrasion | 1 | 1 | 1 | 1 | 1 | 0 | 3 | 3 |
| 30x abrasion | 1 | 1 | 1 | 1 | 1 | 0 | 3 | 3 |
| Spray Rating | | | | | | | | |
| Initial | 80 | 80 | 80 | 75 | 75 | 100 | 75 | 80 |
| 30 HW | 85 | 90 | 90 | 80 | 75 | 100 | 50 | 90 |
| Bundesmann after 30 HW | | | | | | | | |
| % Absortaance | 50.75 | 51.39 | 45.36 | 44.36 | 41.24 | 30.47 | 71.86 | 52.74 |

TABLE 9

Performance results for Examples 11 to 15 and Comparative
Examples G to I on red polyester, 60 g/L loading

|  | Ex 11 | Ex 12 | Ex 13 | Ex 14 | Ex 15 | Comp. Ex. G | Comp. Ex. H | Comp. Ex. I |
|---|---|---|---|---|---|---|---|---|
| Water Drop | | | | | | | | |
| Initial | 5 | 5 | 5 | 4 | 4 | 4 | 5 | 5 |
| 30 HW | 3 | 3 | 3 | 3 | 3 | 3 | 5 | 3 |
| 10x abrasion | 4 | 4 | 4 | 4 | 4 | 4 | 4 | 4 |
| 20x abrasion | 4 | 4 | 4 | 4 | 4 | 4 | 4 | 4 |
| 30x abrasion | 4 | 4 | 4 | 4 | 4 | 4 | 4 | 4 |
| Oil Rating | | | | | | | | |
| Initial | 2 | 3 | 2 | 2 | 1 | 0 | 2 | 2 |
| 30 HW | 0 | 0 | 0 | 0 | 0 | 0 | 1 | 0 |
| 10x abrasion | 0 | 0 | 0 | 0 | 0 | 0 | 1 | 0 |
| 20x abrasion | 0 | 0 | 0 | 0 | 0 | 0 | 0 | 0 |
| 30x abrasion | 0 | 0 | 0 | 0 | 0 | 0 | 0 | 0 |
| Spray Rating | | | | | | | | |
| Initial | 75 | 80 | 80 | 80 | 80 | 100 | 80 | 75 |
| 30 HW | 80 | 75 | 80 | 80 | 80 | 100 | 80 | 70 |
| Bundesmann after 30 HW | | | | | | | | |
| % Absorbance | 22.2 | 23.55 | 19.74 | 15.91 | 17.8 | 3.1 | 20.03 | 23.3 |

Examples 16 to 19

Examples 16 to 19 were prepared by adding a dispersion of urethane based extender to a cationic dispersed partially fluorinated (meth)acrylate/vinylidene chloride/alkyl (meth)acrylate copolymer (water repellent agent) at various ratios as described in Table 10. A blocked isocyanate was also added to the dispersion. The examples were applied to khaki cotton and polyester substrates and tested according to the test methods as described above. Results can be found in Tables 11 and 12.

Comparative Examples J to N

Comparative Examples J to N were prepared by adding a dispersion of urethane based extender, a cationic dispersed partially fluorinated (meth)acrylate/vinylidene chloride/alkyl (meth)acrylate copolymer (water repellent agent) and a blocked isocyanate according to the amounts in Table 10. The examples were applied to khaki cotton and polyester substrates and tested according to the test methods as described above. Results can be found in Tables 11 and 12.

TABLE 10

Extender Compositions for Examples 16 to 19 and Comparative Examples J to N.

| | Wt. % Component | | | | | | | |
|---|---|---|---|---|---|---|---|---|
| Example No. | Fluorinated Copolymer | Urethane Based Extender 3 | Urethane Based Extender 4 | Urethane Based Extender 5 | Urethane Based Extender 6 | PHOBOL XAN | Water | % F |
| 16 | 50 | 30 | 0 | 0 | 0 | 5.0 | 15.0 | 5.3 |
| Comp. Ex. J | 0 | 80 | 0 | 0 | 0 | 5.0 | 15.0 | 0 |
| 17 | 50 | 0 | 30 | 0 | 0 | 5.0 | 15.0 | 5.3 |

TABLE 10-continued

Extender Compositions for Examples 16 to 19 and Comparative Examples J to N.

| | Wt. % Component | | | | | | | |
|---|---|---|---|---|---|---|---|---|
| Example No. | Fluorinated Copolymer | Urethane Based Extender 3 | Urethane Based Extender 4 | Urethane Based Extender 5 | Urethane Based Extender 6 | PHOBOL XAN | Water | % F |
| Comp. Ex. K | 0 | 0 | 80 | 0 | 0 | 5.0 | 15.0 | 0 |
| 18 | 50 | 0 | 0 | 30 | 0 | 5.0 | 15.0 | 5.3 |
| Comp. Ex. L | 0 | 0 | 0 | 80 | 0 | 5.0 | 15.0 | 0 |
| 19 | 50 | 0 | 0 | 0 | 30 | 5.0 | 15.0 | 5.3 |
| Comp. Ex. M | 0 | 0 | 0 | 0 | 80 | 5.0 | 15.0 | 0 |
| Comp. Ex. N | 50 | 0 | 0 | 0 | 0 | 0$^a$ | 50 | 5.3 |

$^a$10 g/L PHOBOL XAN added to pad bath for Comparative Example N.

TABLE 11

Performance results for Examples 16 to 19 and Comparative Examples J to N on khaki bottom-weight cotton, 60 g/L loading

| | Ex 16 | Comp. Ex. J | Ex 17 | Comp. Ex. K | Ex 18 | Comp. Ex. L | Ex. 19 | Comp. Ex. M | Comp. Ex. N |
|---|---|---|---|---|---|---|---|---|---|
| | Water Drop | | | | | | | | |
| Initial | 6 | 3 | 6 | 3 | 6 | 3 | 6 | 3 | 6 |
| 30 HW | 6 | 3 | 6 | 3 | 6 | 3 | 6 | 3 | 6 |
| | Oil Rating | | | | | | | | |
| Initial | 6 | 0 | 6 | 0 | 6 | 0 | 6 | 0 | 6 |
| 30 HW | 6 | 0 | 6 | 0 | 6 | 0 | 6 | 0 | 6 |
| | Bundesmann after 30 HW % Absorbance | | | | | | | | |
| Initial | 15.13 | 26.42 | 11.67 | 33.56 | 19.96 | 26.44 | 12.94 | 27.59 | 15.80 |
| 30 HW | 17.65 | 39.45 | 22.36 | 39.86 | 25.10 | 43.46 | 23.45 | 49.18 | 22.16 |

TABLE 12

Performance results for Examples 16 to 19 and Comparative Examples J to N on on red polyester, 60 g/L loading

| | Ex 16 | Comp. Ex. J | Ex 17 | Comp. Ex. K | Ex 18 | Comp. Ex. L | Ex. 19 | Comp. Ex. M | Comp. Ex. N |
|---|---|---|---|---|---|---|---|---|---|
| | Water Drop | | | | | | | | |
| Initial | 6 | 3 | 5 | 3 | 6 | 3 | 6 | 3 | 6 |
| 30 HW | 6 | 3 | 6 | 3 | 6 | 3 | 6 | 3 | 5 |
| | Oil Rating | | | | | | | | |
| Initial | 4 | 0 | 4 | 0 | 4 | 0 | 4 | 0 | 4 |
| 30 HW | 4 | 0 | 4 | 0 | 4 | 0 | 4 | 0 | 3 |
| | Bundesmann after 30 HW % Absorbance | | | | | | | | |
| Initial | 0.00 | 1.04 | 0.00 | 5.58 | 0.00 | 6.23 | 0.00 | 7.92 | 1.09 |
| 30 HW | 0.01 | 1.67 | 0.00 | 4.41 | 0.00 | 5.46 | 5.56 | 1.72 | 3.98 |

What is claimed is:

1. A method of treating a substrate comprising contacting the substrate with an aqueous composition comprising i) an agent which provides a surface effect and ii) a polymer extender cornposition having no unreacted isocyanate groups comprising a compound prepared by:
  (i) reacting (a) at least one isocyanate group-containing compound selected from isocyanate, diisocyanate, polyisocyanate, or mixture thereof, and (b) at least one isocyanate-reactive compound selected from formula (Ia) or (Ib):

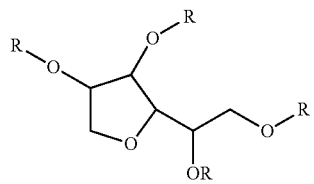

(Ia)

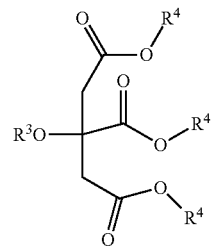

(Ib)

wherein each R is independently a —H; —R$^1$; —C(O)R$^1$; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$;
each n is independently 0 to 20;
each m is independently 0 to 20;
m+n is greater than 0;

each $R^1$ is independently a linear or branched alkyl group having 5 to 29 carbons optionally comprising at least 1 unsaturated bond;

each $R^2$ is independently —H, or a linear or branched alkyl group having 6 to 30 carbons optionally comprising at least 1 unsaturated bond;

or a mixtures thereof, provided that when the compound is of Formula (Ia) then at least one of R or $R^2$ is —H and at least one of R is chosen from —$C(O)R^1$; $(CH_2CH_2O)_n$ $(CH(CH_3)CH2O)_mR^2$; or $(CH_2CH_2O)_n(CH(CH3) CH_2O)_mC(O)R^1$;

each $R^3$ is independently a —H; —$R^1$; —$C(O)R^1$;
—$(CH_2CH_2O)_n(CH(CH_3)CH_2O)_mR^2$; or
—$(CH_2CH_2O)_n(CH(CH_3)CH_2O)_mC(O)R^1$;

each $R^4$ is independently —H, a linear or branched alkyl group having 6 to 30 carbons optionally comprising at least 1 unsaturated bond, or combinations thereof;
—$(CH_2CH_2O)_n(CH(CH_3)CH_2O)_mR^2$; or
—$(CH_2CH_2O)_n(CH(CH_3)CH_2O)_mC(O)R^1$;

each n' is independently 0 to 20;
each m' is independently 0 to 20;
m'+n' is greater than 0; and provided when the compound is Formula (Ib), then the compound is mono-substituted, di-substituted, or tri-substituted with alkyl groups, and at least one $R^2$, $R^3$ or $R^4$ is a —H.

2. A method according to claim 1, wherein the compounds of formulas (Ia) or (Ib) are at least 50% bio-based derived.

3. A method according to claim 1, wherein the compounds of formulas (Ia) or (Ib), are 100% bio-based derived.

4. A method according to claim 1, wherein the diioscyanate or polyisocyanate is selected from the group consisting of hexamethylene diisocyanate homopolymer, 3-isocyanatomethyl-3,4,4-trimethylcyclohexyl isocyanate, bis-(4-isocyanatocylohexyl)methane and dIisocyanate trimers of formulas (IIa), (IIb), (IIc) and IId):

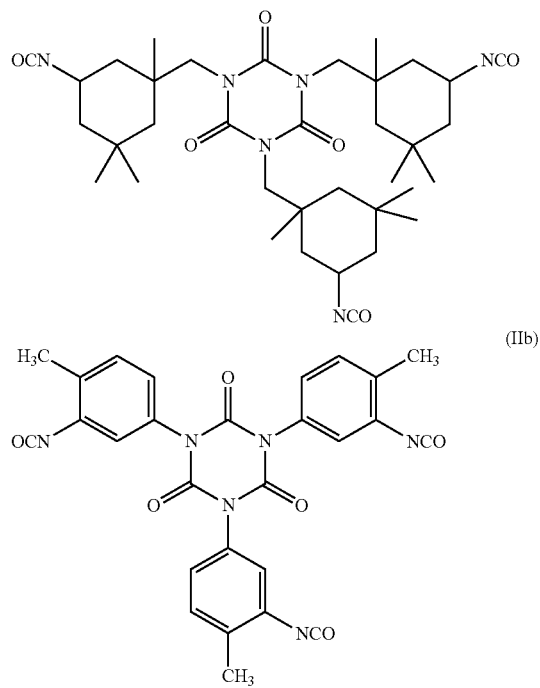

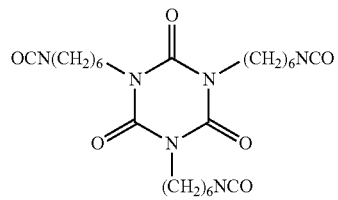

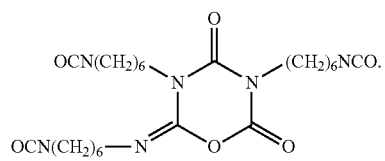

5. A method according to claim 1, wherein step (i) further comprises reacting (c) at least one second compound selected from water, at least one organic compound of Formula (IIa)

$$R^5—X \quad (IIIa),$$

at least one organic compound of Formula (IIIb)

$$R^{15}—(OCH_2CH(OR^{16})CH_2)_z—OR^{17} \quad (IIIb),$$

or mixtures thereof; wherein $R^5$ is selected from a —$C_1$ to $C_{30}$ linear or branched alkyl optionally comprising at least one unsaturated group, a hydroxy-functional $C_1$ to $C_{30}$ linear or branched alkyl, a hydroxy-functional linear or branched $C_1$ to $C_{30}$ polyether, a hydroxy-functional linear or branched polyester, a hydroxy- or amine-functional linear or branched organosiloxane, a thiol-functional $C_1$ to C30 linear or branched alkyl, an amine-functional $C_1$ to $C_{30}$ linear or branched alkyl,

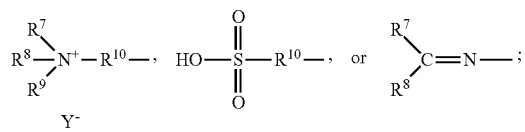

wherein $R^7$, $R^8$, and $R^9$ are each independently, —H, —$C_1$ to $C_6$ alkyl, or combinations thereof;

$R_{10}$ is a divalent alkyl group of 1 to 20 carbons;

X is an isocyanate-reactive group selected from —OH, —$C(O)OH$, —SH, —$NH(R^{12})$, —O—$(CH_2CH_2O)_s$ $(CH(CH_3)CH_2O)_t$—H or —$[C(O)]$—O—$(CH_2CH_2O)_s$ $(CH(CH_3)CH_2O)_t$—H;

$R^{12}$ is —H or a monovalent C1 to C6 alkyl group;

$R^{15}$, $R^{16}$, and $R^{17}$ are each independently a —H; —$R^{18}$; —$C(O)R^{18}$ provided that at least one $R^{15}$, $R^{16}$, or $R^{17}$ is a —H;

$R^{18}$ is independently a linear or branched alkyl group having 5 to 29 carbons optionally comprising at least 1 unsaturated bond;

z is 1 to 15;

Y is —Cl;

s is an integer of 0 to 50;

t is an integer of 0 to 50;

s+t is greater than 0.

6. A method according to claim 5, wherein the second compound (c) is of Formula (IIIa), and X is —O—$(CH_2CH_2O)_s(CH(CH_3)CH_2O)_t$—H; or —$[C(O)]$—O—$(CH_2CH_2O)_s(CH(CH_3)CH_2O)_t$—H.

7. A method according to claim 5, wherein the second compound (c) is of Formula (IIIa),
X is an isocyanate-reactive functional group selected from —OH, —C(O)OH, —SH, —NH($R^{12}$); and
$R^5$ is selected from a —$C_1$ to $C_{30}$ linear or branched alkyl optionally comprising at least one unsaturated group, a hydroxy-functional $C_1$ to $C_{30}$ linear or branched alkyl, a hydroxy-functional linear or branched $C_1$ to $C_{30}$ polyether, a hydroxy-functional linear or branched polyester, a hydroxy-functional linear or branched organosiloxane, a thiol-functional $C_1$ to $C_{30}$ linear or branched alkyl, an amine-functional $C_1$ to C30 linear or branched alkyl.

8. A method according to claim 5, wherein the second compound (c) is of Formula (IIIb).

9. A method according to claim 5, wherein (b) is at least one compound selected from formula (Ia):

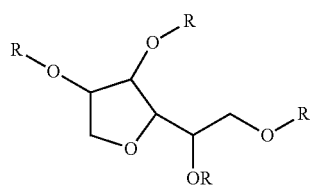
(Ia)

wherein R is independently a —H; —Ri; or —C(O)$R^1$.

10. A method according to claim 5, wherein (b) is at least one compound selected from formula (Ia):

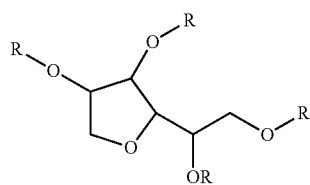
(Ia)

wherein R is independently a —H; —($CH_2CH_2O)_n$(CH($CH_3$)$CH_2O)_mR^2$; or —($CH_2CH_2O)_n$(CH($CH_3$)$CH_2O)_mC(O)R^1$.

11. A method according to claim 5, wherein (b) is at least one compound selected from formula (Ib):

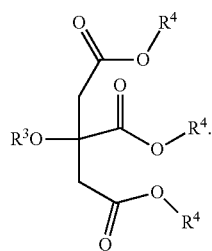
(Ib)

12. The method of claim 1 wherein the surface effect is no iron, easy to iron, shrinkage control, wrinkle free, permanent press, moisture control, softness, strength, anti-slip, anti-static, anti-snag, anti-pill, stain repellency, stain release, soil repellency, soil release, water repellency, oil repellency, odor control, antimicrobial, sun protection, and similar effe(ts.

13. The method of claim 12 wherein the agent is selected from the group consisting of non-fluorinated cationic acrylic polymers, non-fluorinated anionic acrylic polymers, non-fluorinated nonionic acrylic polymers, partially fluorinated urethanes, cationic partially fluorinated acrylic polymers or copolymers, nonionic partially fluorinated acrylic polymers or copolymers, partially fluorinated acrylamide polymers or copolymers, silicones, and parafins.

14. The method of claim 12 wherein the ratio of the extender composition to the agent is from about 1:10 to about 10:1.

15. The method of claim 1 wherein the composition further comprises a blocked isocyanale.

16. The method of claim 1 wherein the composition further comprises an additive selected from the group consisting of a surfactant, emulsifier, pH adjuster, crosslinker, wetting agent, and softener.

17. The method of claim 1 wherein the substrate is a fiber, textile, fabric, fabric blend, paper, nonwoven, leather or combination thereof.

18. A substrate treated by the method of claim 1.

19. An aqueous composition for treating a substrate comprising i) an agent which provides a surface effect and ii) a polymer extender composition having no unreacted isocyanate groups comprising a compound prepared by:
(i) reacting (a) at least one isocyanate group-containing compound selected from isocyanate, diisocyanate, polyisocyanate, or mixture thereof, and (b) at least one isocyanate-reactive compound selected from formula (Ia) or (Ib):

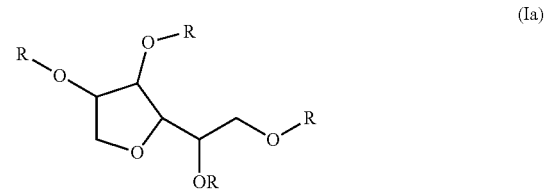
(Ia)

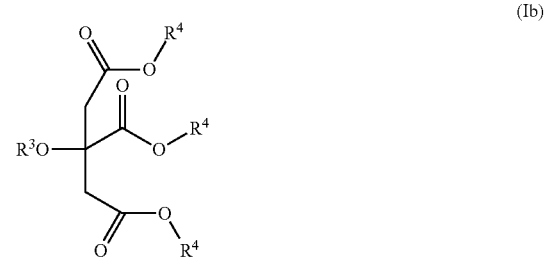
(Ib)

wherein each R is independently a —H; —$R^1$; —C(O)$R^1$; —($CH_2CH_2O)_n$(CH($CH_3$)$CH_2O)_mR^2$; or —($CH_2CH_2O)_n$(CH($CH_3$)$CH_2O)_mC(O)R^1$;
each n is independently 0 to 20;
each m is independently 0 to 20;
m+n is greater than 0;
each $R^1$ is independently a linear or branched alkyl group having 5 to 29 carbons optionally comprising at least 1 unsaturated bond;
each $R^2$ is independently —H, or a linear or branched alkyl group having 6 to 30 carbons optionally comprising at least 1 unsaturated bond;
or a mixtures thereof,
provided that when the compound is of Formula (Ia) then at least one of R or $R^2$ is —H and at least one of R is chosen from —C(O)$R^1$; ($CH_2CH_2O)_n$(CH($CH_3$)$CH_2O)_mR^2$; or ($CH_2CH_2O)_n$(CH($CH_3$)$CH_2O)_mC(O)R^1$;

each $R^3$ is independently a —H; —$R^1$; —C(O)$R^1$; —(CH$_2$CH$_2$O)$_n$(CH(CH$_3$)CH$_2$O)$_{m'}R^2$; or —(CH$_2$CH$_2$O)$_{n'}$(CH(CH$_3$)CH$_2$O)$_{m'}$C(O)$R^1$;

each $R^4$ is independently —H, a linear or branched alkyl group having 6 to 30 carbons optionally comprising at least 1 unsaturated bond, or combinations thereof; —(CH2CH2O)$_{n'}$(CH(CH$_3$)CH$_2$O)$_{m'}R^2$; or —(CH$_2$CH$_2$O)$_{n'}$(CH(CH$_3$)CH$_2$O)$_{m'}$C(O)$R^1$;

each n' is independently 0 to 20;
each m' is independently 0 to 20;
m'+n' is greater than 0; and
provided when the compound is Formula (Ib), then the compound is mono-substituted, di-substituted, or tri-substituted with alkyl groups, and at least one $R^2$, $R^3$ or $R^4$ is a —H.

20. The composition of claim 19, wherein the diisocyanate or polyisocyanate is selected from the group consisting of hexamethylene diisocyanate homopolymer, 3-isocyanatomethyl-3,4,4-trimethylcyclohexyl isocyanate, bis-(4-isocyanatocylohexyl)methane and diisocyanate trimers of formulas (IIa), (IIb), (IIc) and (IId):

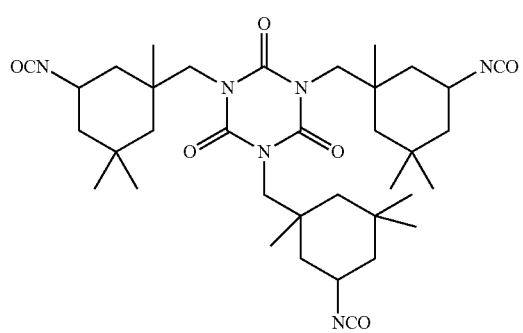

(IIa)

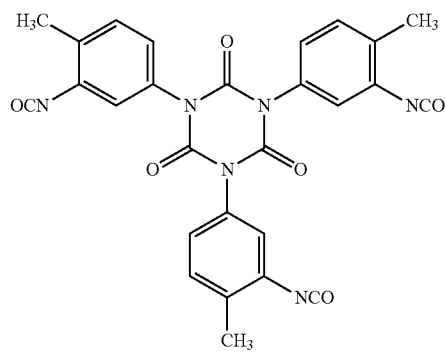

(IIb)

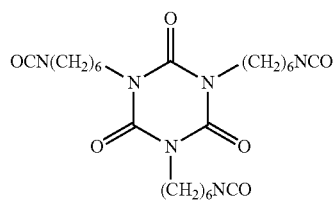

(IIc)

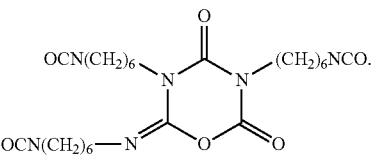

(IId)

21. The composition of claim 19, wherein step (i) further comprises reacting (c) at least one second compound selected from water, at least one organic compound of Formula (IIIa)

$$R^5X \quad (IIIa),$$

at least one organic compound of Formula (IIIb)

$$R^{15}\text{—(OCH}_2\text{CH(OR}^{16}\text{)CH}_2\text{)}_z\text{—OR}^{17} \quad (IIIb),$$

or mixtures thereof; wherein
$R^5$ is selected from a —$C_1$ to $C_{30}$ linear or branched alkyl optionally comprising at least one unsaturated group, a hydroxy-functional $C_1$ to $C_{30}$ linear or branched alkyl, a hydroxy-functional linear or branched $C_1$ to $C_{30}$ polyether, a hydroxy-functional linear or branched polyester, a hydroxy- or amine-functional linear or branched organosiloxane, a thiol-functional $C_1$ to $C_{30}$ linear or branched alkyl, an amine-functional alto $C_1$ to $C_{30}$ linear or branched alkyl,

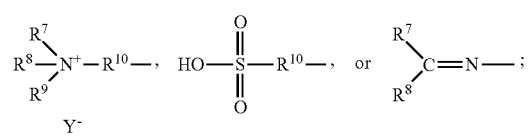

wherein
$R^7$, $R^8$, and $R^9$ are each independently, —H, —$C_1$ to $C_6$ alkyl, or combinations thereof;
$R^1$ is a divalent alkyl group of 1 to 20 carbons;
X is an isocyanate-reactive group selected from —OH, —C(O)OH, —SH, —NH($R^{12}$), —O(CH$_2$CH$_2$O)$_s$(CH(CH$_3$)CH$_2$O)$_t$—H or —[C(O)]—O—(CH$_2$CH$_2$O)$_s$(CH(CH$_3$)CH$_2$O)$_t$—H;
$R^{12}$ is —H or a monovalent C1 to C6 alkyl group;
$R^{15}$, $R^{16}$, and $R^{17}$ are each independently a —H; —$R^{18}$; —C(O)$R^{18}$ provided that at least one $R^{15}$, $R^{16}$, or $R^{17}$ is a —H;
$R^{18}$ is independently a linear or branched alkyl group having 5 to 29 carbons optionally comprising at least 1 unsaturated bond;
z is 1 to 15;
Y is —Cl;
s is an integer of 0 to 50;
t is an integer of 0 to 50;
s+t is greater than 0.

* * * * *